Patented Apr. 1, 1947

2,418,311

UNITED STATES PATENT OFFICE 2,418,311

PROCESS OF TREATING CHICK-HATCHERY WASTE TO RECOVER PROTEIN-FAT CONCENTRATES

William D. McFarlane, Ste. Anne de Bellevue, Quebec, and Nikolai Nikolaiczuk, Macdonald College, Quebec, Canada, assignors to The Ogilvie Flour Mills Co. Limited, Montreal, Quebec, Canada No Drawing. Application March 26, 1945, Serial No. 585,018

6 Claims. (Cl. 99—2)

This invention relates to the preparation of a protein-fat concentrate from chick-hatchery waste by a process in which the waste material is subjected to the action of lignin under conditions yielding a product which is rich in protein and fat, is easily dried and ground by ordinary drying and grinding procedures and has special nutritional value when used in mixed livestock feeds as a supplement to cereal grains.

Chick-hatchery waste, comprising infertile eggs, eggs with blood spots, dead embryos and dead chicks, is now largely disposed of as fertilizer or garbage since this material is not readily converted into a stable powder by ordinary methods of drying because of its high fat content and the peculiar physical properties of the proteins present. The compost gives up moisture slowly at elevated temperatures and the dry residue is a sticky mass which cannot readily be ground to a powder because of the large proportion of surface fat. If the fat is first extracted the residue is also refractory because the protein forms a glass-like mass during drying.

The present invention is based on the discovery that heating of chick-hatchery waste in the presence of lignosulfonic acid or salts thereof results in separation of a fraction which is rich in protein and fat and is easily dried and ground to yield a stable powder which may be employed as a valuable nutritional supplement to the cereal grains used in mixed livestock feeds. In this process the lignin increases the recovery of egg protein by precipitating water-soluble egg proteins, such as ovomucoid, which are not coagulated by heat. The lignin also serves to alter the physical nature of the coagulum so that the water can be removed in a filter-press and the resulting press-cake dried in a current of warm air. The lignin also serves as a granulating agent which alters the physical nature of the mass so that, in its dried condition, the mass is sufficiently granular and free from surface fat to enable it to be easily ground without "balling" in ordinary grinding machinery. The amount of lignin required to bring about these results is relatively small and this is an important consideration in view of the fact that the lignin contained in the final product is an inert diluent.

Representative samples of chick-hatchery waste (including infertile eggs, eggs with blood spots and dead embryos at various stages of development) with or without the shells, have been successfully processed in accordance with our invention by the procedure described in the following example:

*Example*

200 g. of the material was mixed in a 1 litre beaker, with 35 c. c. of sulfite waste liquor obtained from a wood pulp mill. This mixture was boiled in the beaker for about 5 minutes by direct contact with steam taken from a high pressure line at a pressure of approximately 45 lbs. per square inch. The coagulum was allowed to drain on cheese cloth and the residual moisture was pressed from the mass in a Carver press employing pressure up to 10,000 lbs. per square inch, the material being held in a canvas filter cloth. The yield of press-cake was approximately 50 grams (exclusive of shell) containing 10% of water. The cake was broken up by hand and dried by placing it for a period of approximately one hour in a current of hot air heated to a temperature of about 80° C. The dried material was then ground to a fine powder which, on analysis (in the case of the shell free product) was found to contain 50.35% crude protein (nitrogen x 6.25); 39.75% fat; 2.46% ash and 1.2% moisture. The approximate recoveries of protein and fat were 92% and 94% respectively.

The passing of steam into direct contact with the mixture of waste material and sulfite waste liquor ensures efficient recovery of protein and fat by heat coagulation and is also beneficial in destroying pathogenic bacteria which may be present. It will be understood, however, that the coagulation of the material by the application of heat may be satisfactorily accomplished in various ways, for example, by external heating with mechanical agitation. In the latter case the material is heated in a suitable heating vessel equipped with a mechanical stirrer operating at moderate speed and the heating and stirring is continued until the coagulum forms a granular mass. Extraneous moisture can then be removed from the granular mass as described in the cited example or, if desired, the whole coagulum may be directly dried without pressing so that complete retention of water-soluble vitamins and inorganic salts may be achieved. In this case, when the whole egg is processed the presence of the lignin changes the physical nature of the material so that subsequent drying is more rapid and the dried material is sufficiently granular and free from surface fat to enable it to be easily ground with ordinary machinery.

In carrying out the process of our invention the sulfite waste liquor may be used in its original dilute condition or, after it has been suitably concentrated by partial evaporation. It is also feasible to use a concentrated solution of dried sulfite waste liquor or salts of lignosulfonic acid. These alternatives to the use of the sulfite waste liquor in its original dilute condition can be employed to particular advantage to reduce the volume of water to be evaporated when the whole-egg material is to be dried.

We have also found that the addition of a small amount of hydrochloric acid to the hatchery-waste prior to the heating thereof in the presence of the lignin or lignosulfonic acid gives a lighter coloured final product without adversely affecting the yield. The optimum amount of hydrochloric acid used for this purpose is about 0.5 c. c. of concentrated hydrochloric acid to 200 grams of the egg or other hatchery waste.

Having thus described the nature of our invention and several examples thereof, it will be understood that various modifications may be resorted to within the scope and spirit of the invention as defined by the appended claims.

We claim:

1. The process of treating chick-hatchery waste which comprises subjecting the waste material to the action of lignin in the presence of heat and then drying the waste material.

2. The process of treating chick-hatchery waste which comprises subjecting the waste material to the action of a treating agent selected from the class comprising lignosulfonic acid and salts thereof in the presence of heat and then drying the waste material.

3. The process of treating chick-hatchery waste which comprises adding lignin-containing sulfite waste liquor thereto and heating and then drying the resulting mixture.

4. The process of treating chick-hatchery waste which comprises heating the waste material to a coagulating temperature in the presence of a treating agent selected from the class comprising lignosulfonic acid and its salts and drying and grinding the waste material.

5. The process of treating chick-hatchery waste to recover a fraction rich in protein and fat which comprises heating the waste material to a coagulating temperature in the presence of a treating agent selected from the class comprising lignosulphonic acid and its salts and separating and drying the resulting coagulum.

6. The process of treating chick-hatchery waste which comprises adding hydrochloric acid to the waste material, subjecting the resulting mixture to the action of lignin in the presence of heat and then drying the heated material.

WILLIAM D. McFARLANE.
NIKOLAI NIKOLAICZUK.